United States Patent
Hirsch

(10) Patent No.: US 8,787,178 B2
(45) Date of Patent: Jul. 22, 2014

(54) SELF MONITORING OF MANAGED ENTITIES IN A TELECOMMUNICATION NETWORK

(75) Inventor: Lucian Hirsch, Munich (DE)

(73) Assignee: Nokia Solutions and Networks Oy, Epsoo (FI)

( * ) Notice: Subject to any disclaimer, the term of this patent is extended or adjusted under 35 U.S.C. 154(b) by 701 days.

(21) Appl. No.: 12/669,870

(22) PCT Filed: Jul. 17, 2008

(86) PCT No.: PCT/EP2008/059384
§ 371 (c)(1),
(2), (4) Date: Jan. 20, 2010

(87) PCT Pub. No.: WO2009/013216
PCT Pub. Date: Jan. 29, 2009

(65) Prior Publication Data
US 2010/0185901 A1  Jul. 22, 2010

(30) Foreign Application Priority Data

Jul. 20, 2007 (EP) .................................. 07014332

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/249; 370/222; 370/224; 370/236; 370/252

(58) Field of Classification Search
USPC ......... 370/217, 222, 224, 236, 242, 249, 252, 370/254–258
See application file for complete search history.

(56) References Cited

U.S. PATENT DOCUMENTS 6,154,448 A * 11/2000 Petersen et al. ............... 370/248
6,420,968 B1 * 7/2002 Hirsch ........................... 340/506
7,564,778 B2 * 7/2009 Soumiya et al. .............. 370/221

(Continued)

FOREIGN PATENT DOCUMENTS

EP  1253749      10/2002
EP  1253749 A2 * 10/2002

*Primary Examiner* — Benjamin H Elliott, IV
(74) *Attorney, Agent, or Firm* — Squire Patton Boggs (US) LLP

(57) ABSTRACT

It is described a method for monitoring the operational state of a telecommunication network (100) having a first level (110) comprising a plurality of managed entities (111) and a second level (120) comprising a management system (121) for the managed entities (111) of the first level (110). The described method comprises propagating a first notification (151) within the first level (110) from a first managed entity (111) to a second managed entity (111), and transmitting a second notification (161) from one of the plurality of managed entities (111) to the management system (121). The second notification (161) comprises an information being indicative for the operational state of at least one another of the plurality of managed entities (111). Preferably, the managed entities (111) are arranged within a closed loop (152) such that the first notification (151) is propagating along this loop (152). After a full turn of the first notification (151) the second notification (161) is transmitted indicating that all managed entities (111) are in operation. Further, it is described managed entity (111) and a telecommunication network (100), which are adopted for carrying out the described monitoring method.

15 Claims, 3 Drawing Sheets

(56) References Cited

U.S. PATENT DOCUMENTS

| | | | |
|---|---|---|---|
| 2003/0048752 A1* | 3/2003 | Fontana et al. | 370/236.2 |
| 2005/0025061 A1 | 2/2005 | Pedersen et al. | |
| 2005/0111372 A1 | 5/2005 | Koestner et al. | |
| 2006/0285501 A1* | 12/2006 | Damm | 370/252 |
| 2010/0185901 A1* | 7/2010 | Hirsch | 714/48 |

* cited by examiner

SELF MONITORING OF MANAGED ENTITIES IN A TELECOMMUNICATION NETWORK

FIELD OF INVENTION

The present invention relates to the technical field of telecommunication networks being designed in a hierarchical structure. In particular the present invention relates to a method for monitoring the operational state of a telecommunication network having a first level comprising a plurality of managed entities and a second level comprising a management system for the managed entities of the first level. Further, the present invention relates to a managed entity and to a telecommunication network, which are suitable and adopted for carrying out the described monitoring method.

ART BACKGROUND

The designs of modern telecommunication networks are based on Telecommunication Management Network (TMN) principles. The TMN principles define several levels for the management of a telecommunication network. Thereby, each level provides for two functionalities:

(a) A first functionality is the so called managing function for managing entities being assigned to a lower level. The managing functionality is necessary for all levels except for the lowest level.

(b) The second functionality is the so called agent function for communicating with the proximate higher level. The agent functionality is necessary for all levels except for the highest level.

The manager-agent communication is effected via management interfaces, which are defined in an object-oriented environment by means of a communication protocol and an object model. The communication protocol may be for instance Common Object Request Broker Architecture (COBRA), Common Management Information Protocol (CMIP) or Simple Network Management Protocol (SNMP). The object model is often also called a Network Resource Model (NRM). Such interfaces are used for instance in an Universal Mobile Telecommunications System (UMTS) between the Network Element (NE) management level and the NE level and between the Network Management (NM) level and the NE management level.

For starting a monitoring and a controlling of a telecommunication network, a manager initiates requests, which are executed in agent parts of managed entities. Thereby, the manager receives corresponding responses. In order to guarantee an efficient NM, an agent recognizes relevant events within the network, generates so called notifications and transmits these notifications as event reports to the manager being arranged in the next higher level.

For a reliable management of a telecommunication network it is essential that relevant event messages are forwarded as fast as possible and without any failure to the manager system. This requirement can be fulfilled by taking two measures:

A) According to a first measure a manager has to subscribe the desired event messages from an agent. In order to realize this first measure the 3$^{rd}$ Generation Partnership Program (3GPP) standard TS 32.302 "Notification Integration Reference Point (IRP): Information Service" defines a so called subscribe operation. Thereby, the manager transmits to the agent a subscription request, which comprises detailed specifications about the type and the parameter values of desired event messages. In addition, the manager can use a so called time-tick parameter, which defines a time span within which a request for the subscription status (get-subscription-status request) to the agent has to be submitted. Therewith, the agent is able also to monitor the availability of the higher-ranking management system.

B) According to a second measure a failure of an agent and/or a failure of the logical connection between an agent and the corresponding manager have to be determined very quickly. In order to realize this second measure a monitoring mechanism has to be implemented at the interfaces between manager and agent. In 3GPP such a monitoring mechanism is standardized as 3GPP TS 32.352 and is called "Communication Surveillance Integration Reference point: Information Service".

The "Communication Surveillance Integration Reference point: Information Service" is based on the following two principles:

A) The agent periodically transmits a so called heartbeat notification to the manager. From a continuous and correct reception of these heartbeat notifications the manager can conclude that both the agent and the communication through the manager-agent interface are working properly.

B) In order to monitor the reception of heartbeat notifications at regular intervals the manager uses an own timer. The elapsed time of the timer corresponds to the heartbeat period. After having received a heartbeat notification the timer is set again in its initial condition. A time lapse (time-out) of the timer without a new reception of a heartbeat notification shows the manager, that there is a failure in the subsidiary agent system and/or in the communication channel between manager and agent.

The architecture of the Radio Access Network (RAN) of future Long Term Evolution (LTE) networks envisages a flat and decentralized structure of Base Stations (BS), which are denominated evolution Node Base stations (eNodeBs). The absence of controller network elements such as Base Station Controllers (BSC) being used for Global System for Mobile telecommunication (GSM) networks or Radio Network Controller (RNC) being used for UMTS Terrestrial Radio Access Network (UTRAN) requires on the one hand a direct connection between the BS and the management systems such as Element Management System (EMS) or Network Management System (NMS) and on the other hand a peer-to-peer connection between the individual eNodeBs in order to administer the neighborhood relationships between adjacent radio cells.

FIG. 2 depicts the architecture of such a LTE telecommunication network 200, which at the time this application has been drafted has not yet been implemented for commercial purposes. The telecommunication network 200 comprises a first level 210, in which a plurality of eNodeBs 211 is arranged. Each eNodeB comprises an agent part 211a for generating event messages according to the employed object model at the interface to management system and for transmitting these event messages to a management system 221 representing the second level 220 of the telecommunication network 200.

The management system 220 subscribes for heartbeat notifications from each of the eNodeBs 211. The subscription for receiving heartbeat notifications is indicated in FIG. 2 by the arrows 290. The corresponding transmission of heartbeat notifications from the eNodeBs 211 to the management system 221 is indicated by the arrows 291. The above described necessary peer to peer connections are designated with reference numeral 295.

Since it is expected that future LTE networks will comprise a high number of eNodeBs 211, the above described known method for monitoring managed entities will exhibit several disadvantages. In particular a very high number of heartbeat notifications will have to be transmitted to the management system 221 within a short time period. This has the effect, that a high data transmission load in particular to the interfaces in between the first level 210 and the second level 220 and additionally on the management system 221 is produced even if all components of the telecommunication network are in proper operation.

There may be a need for improving the efficiency for monitoring the operational state of a telecommunication network comprising a plurality of managed entities being arranged in a first level.

SUMMARY OF THE INVENTION

This need may be met by the subject matter according to the independent claims. Advantageous embodiments of the present invention are described by the dependent claims.

According to a first aspect of the invention there is provided a method for monitoring the operational state of a telecommunication network having a first level comprising a plurality of managed entities and a second level comprising a management system for the managed entities of the first level. The provided method comprises (a) propagating a first notification within the first level from a first managed entity to a second managed entity, and (b) transmitting a second notification from one of the plurality of managed entities to the management system. Thereby, the second notification comprises an information being indicative for the operational state of at least one another of the plurality of managed entities.

This aspect of the invention is based on the idea that a self monitoring of the managed entities can be performed before informing the management system about the operational state of the managed entities. Thereby, one managed entity is quasi horizontally coupled with another managed entity within the first level of the telecommunication network. Depending on the number of managed entities, which are coupled by means of the first notification respectively which are involved in propagating the first notification within the first level, the second notification may be indicative for the operational state of a plurality of managed entities. Thereby, a highly efficient method is provided which allows for reporting to the management system the operational state of a plurality of managed entities by means of a single second notification only.

A managed entity can be for instance network element such as a base station in a second or third generation mobile telecommunication network or a so called eNodeB in a so-called fourth generation mobile telecommunication network. However, according to the invention a managed entity can also be a network element controlling or managing entity in a hierarchic system architecture, which comprises at least three levels. This means that the managed entity can also be an entity which itself provides management functionality. In this context the managed entities may be for instance an element management system or a network management system, which is managed by a management system being assigned to a higher level of the whole communication network.

According to an embodiment of the invention, if all managed entities are in operation, (a) the first notification is a notify-loopback notification which is sequentially propagating from one managed entity to another managed entity in such a manner that a virtual loop is formed, wherein this loop comprises each of the plurality of managed entities, and (b) the second notification is a notify-cluster-in-operation notification reporting the management system that all managed entities of the loop are in operation.

Thereby, a symmetric arrangement is realized wherein each managed entity in the loop takes the role of (a) a manager of one neighbouring entity and (b) an agent of another neighbouring entity. This allows for a self monitoring of the plurality of managed entities. The self monitoring may provide the advantage that in particular when the telecommunication network comprises a high number of managed entities the management system has to receive and further process a significantly reduced number of notifications only. According to the described telecommunication network monitoring method this is achieved by first propagating the notify-loopback notification only between the participating managed entities and not to the management system. Thereby, for monitoring the whole telecommunication network the data transmission load on the network and the load on the management system can be reduced significantly.

According to a further embodiment of the invention each of the plurality of managed entities (a) subscribes for a notify-loopback notification from a respectively neighbouring managed entity and (b) awaits a reception of the notify-loopback notification from the respectively neighbouring managed entity within a loopback-period time span. This may provide the advantage that before the monitoring procedure for the telecommunication network starts the sequential arrangement of all managed entities within the loop is defined. Thereby, the management system can be provided with a precise knowledge about the arrangement of the managed entities within the loop. As will be described below in detail a predetermined order of managed entities within the loop is an important requirement in order to allow the management system to recognize and identify different errors in case at least one of the managed entities or at least a communication channel between a managed entity and the management system is not operating properly.

The loopback period time span may be defined by the management system. Alternatively, the loopback period time span may be selected and/or configured for each managed entity individually.

According to a further embodiment of the invention an originator entity of the plurality of managed entities initiates the propagation of the notify-loopback notification. This means that when a telecommunication network is set up the originator entity can be selected by the management system by transmitting a corresponding "trigger loopback" command to one of the managed entities representing the originator entity. Therefore, the management system is able to control the starting time of the propagation of the notify-loopback notification. Further, the management system is able to select the originator of the notify-loopback notification.

According to a further embodiment of the invention the originator entity generates the notify-loopback notification, wherein the notify-loopback notification comprises (a) a notification type parameter identifying the notification as to represent a notify-loopback notification and (b) an initiator parameter identifying the originator entity as the managed entity which has generated the notify-loopback notification. This may provide the advantage that it can be easily determined when the notify-loopback notification has propagated along the full loop and comes back to the originator entity. A complete propagation along the full loop means that all managed entities forming the loop are working properly.

A complete propagation of the notify-loopback notification along the whole loop can be easily achieved if the managed entities apply the following rule: If the initiator parameter has a different identification number compared to the managed entity, which currently handles the notify-loopback notification, the current managed entity forwards the notify-loopback notification to the next respectively to the following managed entity. Thereby, the notify-loopback notification propagates along the whole loop of managed entities.

According to a further embodiment of the invention, when the originator entity has received the notify-loopback notification identifying the originator entity as the managed entity which has generated the notify-loopback notification, the originator entity transmits a notify-cluster-in-operation notification to the management system. This means that the originator entity recognizes that the notify-loopback notification has exactly propagated the full loop of managed entities. This recognition can be very reliable because the originator entity can easily identify the initiator parameter representing the originator entity as the managed entity which has generated the notify-loopback notification.

After having generated respectively after having transmitted the notify-cluster-in-operation notification the originator entity may again generate a further notify-loopback notification being substantially identical to the previous notify-loopback notification and transmit this further notify-loopback notification to the next neighbouring managed entity in the predefined loop of managed entities. This means that in case the whole communication network is continuously working one and the same originator entity will transmit repeatedly and preferably periodically a notify-cluster-in-operation notification indicating the management system that all managed entities within the second level of the telecommunication network are operating properly.

According to a further embodiment of the invention, when the originator entity has transmitted a notify-cluster-in-operation notification to the management system, a further originator entity initiates the propagation of a further notify-loopback notification. Thereby, (a) within the loop the further originator entity is a neighbouring entity of the originator entity and (b) the further notify-loopback notification comprises a further initiator parameter identifying the further originator entity as the managed entity which has generated the further notify-loopback notification.

This means that in case the whole communication network is continuously working within the loop of managed entities after each full turn of a notify-loopback notification the position respectively an identification number of the currently active originator entity is shifted by one order. In other words, each of the managed entities cyclically adopts the role of the originator entity for monitoring the whole plurality of managed entities. Therefore, the corresponding notify-cluster-in-operation notifications will be transmitted to the management system by all possible transmission channels between the management system and respectively one of the managed entities.

The cyclically usage of different managed entities as the originator entity may provide the advantage that automatically also the transmission channels between the various managed entities and the management system are monitored. In other words by carrying out described method not only the operability of the managed entities but the whole two level telecommunication network is monitored.

Preferably, the further originator entity is a downstream neighbouring entity of the originator entity. This means that the further notify-loopback notification originates from the second managed entity of the loop of the notify-loopback notification. This may provide the advantage that due to the avoidance of any overlap between the path of the notify-loopback notification and the further path of the further notify loopback notification an in particular high efficiency of the monitoring method may be provided.

In order to make sure that the management system is able to receive all notify-cluster-in-operation notifications from any one of the managed entities, which currently represent the originator entity, the management system may subscribe from all managed entities that in addition to usual event messages also the notify-cluster-in-operation notifications are supposed to be transmitted from the managed entities to the management system. The usual event messages may be for instance alarm messages, messages indicating a change in the operational state and/or messages indicating a change of configuration.

According to a further embodiment of the invention, when the originator entity has transmitted a notify-cluster-in-operation notification to the management system, the originator entity triggers the further originator entity in order to initiate the propagation of the further notify-loopback notification.

Preferably, the triggering can be realized by generating a preliminary notify-loopback notification and transmitting this preliminary notify-loopback notification from the originator entity to the further originator entity. This preliminary notify-loopback notification may have the same format and the same structure as the notify-loopback notification and/or the further notify-loopback notification. The preliminary notify-loopback notification may only differ from a usual notify-loopback notification by the selection of the initiator parameter. Preferably, the initiator parameter of the preliminary notify-loopback notification comprises an empty value.

This means that the further originator entity is activated by inserting a proper entity identification value into the preliminary notify-loopback notification. Thereby, the preliminary notify-loopback notification is transferred into a further notify-loopback notification identifying the further managed entity as the entity which represents the starting point for the further notify-loopback notification.

According to a further embodiment of the invention each managed entity comprises a managing part and an agent part. Thereby, (a) the managing part is coupled to an agent part of another managed entity, which is located upstream with respect to the propagation direction of the first notification and (b) the agent part is coupled to a managing part of a further another managed entity, which is located downstream with respect to the propagation direction of the first notification.

This may provide the advantage that an efficient and reliable self monitoring of the plurality of managed entities may be achieved. Thereby, each managed entity plays the role both of (a) an agent being managed by the managing part of another entity arranged downstream and of (b) a manager managing the agent part of another entity arranged upstream. Thereby, a highly symmetric arrangement of the managed entities within the first level of the telecommunication network may be provided.

According to a further embodiment of the invention, if one of the managed entities exhibits a failure, (a) the corresponding upstream neighbouring managed entity transmits a first alarm message to the management system, the first alarm message indicating that the managing part of the one of the managed entities exhibits a failure, and (b) the corresponding downstream neighbouring managed entity transmits a second alarm message to the management system, the second alarm message indicating that the agent part of the one of the managed entities exhibits a failure.

The failure of the managing part may be recognized easily by the upstream entity if, in case of a correctly operating entity, a get-subscription-status request is received from the managing part of the one of the managed entities. Therefore, if the managing part exhibits a failure, the upstream entity cannot receive such a get-subscription-status request within a predetermined time period. This predetermined time period, which may be denominated "time tick", may be defined within the above described subscription parameter for the notify-loopback notification from a respectively neighbouring managed entity.

The failure of the agent part of the one of the managed entities may be recognized easily by the downstream entity if, in case of a correctly operating entity a response to a get-subscription-status request is received by the downstream entity. This response may usually be generated by the agent part of the one of the managed entities in response to a corresponding get-subscription-status request. In case of an absence of such a response to the get-subscription-status request the second alarm message may be triggered.

By combining the first and the second alarm message the management system can conclude that both the managing part and the agent part of the one of the managed entities are not in operation.

According to a further embodiment of the invention the downstream neighbouring managed entity (a) generates a notify-loopback notification identifying the downstream neighbouring managed entity as the managed entity which has generated this notify-loopback notification and (b) transmits this notify-loopback notification to further managed entities being arranged further downstream with respect to the upstream neighbouring managed entity and with respect to the propagation direction of the first notification respectively the notify-loopback notification. This may provide the advantage that even if one of the managed entities exhibits a failure, the self monitoring of the further respectively the remaining managed entities may still be possible. Thereby, this notify-loopback notification propagates along the remaining loop of the plurality of managed entities.

It has to be mentioned that of course if one of the managed entities exhibits a failure the notify-loopback notification cannot propagate along the full loop. Therefore, the above described notify-cluster-in-operation notification will not be transmitted to the management system. However, if the notify-loopback notification will propagate along a section of the loop, the corresponding managed entities will not repeat the alarm messages being related to the failure of the one of the managed entities.

According to a further embodiment of the invention, if the agent part of one of the managed entities exhibits a failure, the corresponding downstream neighbouring managed entity transmits the second alarm message. As has already been defined above, the second alarm message indicates that the agent part of the one of the managed entities exhibits a failure.

In case solely the agent part of one of the managed entities exhibits a failure the management system will only receive the second alarm message. Further alarm messages will not be generated. Therefore, when exclusively receiving the second alarm message the management system can easily conclude that (a) the agent part of the one of the managed entities exhibits a failure and (b) the managing part of the one of the managed entities exhibits is still ready for operation.

It has to be mentioned that also in case only the agent part of one of the managed entities is out of operation, the downstream neighbouring managed entity might generate a notify-loopback notification. As has already been described above this notify-loopback notification can identify the downstream neighbouring managed entity as the managed entity which has generated this notify-loopback notification. Further, the downstream neighbouring managed entity may transmit this notify-loopback notification to further managed entities being arranged further downstream with respect to the upstream neighbouring managed entity and with respect to the propagation direction of the first notification respectively the notify-loopback notification. With respect to the advantages of such a procedure reference is made to the advantages described above with respect to the claim describing the generation and the transmission of the notify-loopback notification in case one of the managed entities exhibits a complete failure.

According to a further embodiment of the invention, if a transmission channel between the management system and one of the managed entities exhibits a failure, the management system records the absence of a second notification respectively a notify-cluster-in-operation notification.

In particular if all managed entities of a full loop are in operation and each of the managed entities cyclically adopts the role of the originator entity for monitoring the whole plurality of managed entities and for reporting the operational state of all the managed entities to the management system, a notify-cluster-in-operation notification will be transmitted cyclically by each managed entity. As a consequence, the management system can easily recognize the absence of at least one of the notify-cluster-in-operation notifications. In this case, if other managed entities still transmit notify-cluster-in-operation notifications to the management system, the management system can conclude that all managed entities are operating properly and only the connection between at least one of the managed entities and the management system has been lost.

It has to be mentioned that in case of repair and/or maintenance work locally at a managed entity the management system should be able to temporarily stop the self monitoring of the plurality of managed entities. This can be achieved for instance by means of a command "stop-loopback", which is transmitted from the management system to the managed entities.

According to a further aspect of the invention there is provided a managed entity. The managed entity may be in particular a network element for a telecommunication network. The managed entity is designed in such a manner that in connection with a management system and at least one further managed entity the monitoring method as described above can be carried out.

This aspect of the invention is based on the idea that by horizontally communicating with each other within a first level of the telecommunication network, a self monitoring of the managed entities can be effectively provided. In case all managed entities are in operation, the first notification, which may be denominated a notify-loopback notification, is transferred in between a plurality of managed entities. Preferably, a loop is formed which comprises each of the plurality of managed entities. After the notify-loopback notification has propagated the full loop and reaches the initial managed entity, this entity generates a second notification, which may be denominated a notify-cluster-in-operation notification. Thereby, the notify-cluster-in-operation notification reports to the management system that all managed entities of the loop are currently in operation. Therefore, by transmitting only one notification to the management system the status "in operation" can be verified for all of the managed entities which are involved in the loop.

The described managed entity, which provides a self monitoring functionality, allows for an effectively monitoring of the operational state of a whole network comprising a plurality of managed entities. The higher the number of managed entities, the higher is the efficiency of the self monitoring.

Therefore, the described managed entity may be used in particular for telecommunication networks comprising several thousand or even several ten thousands of managed entities respectively network elements.

According to a further aspect of the invention there is provided a telecommunication network and in particular a telecommunication network for mobile terminal devices. The telecommunication network comprises (a) a management system and (b) at least two managed entities as described above.

The telecommunication network may be an arbitrary telecommunication network such as a second Generation (2G) Global System for Mobile telecommunication (GSM), a General Packet Radio Service (GPRS) telecommunication network, a third Generation (3G) Universal Mobile Telecommunications System (UMTS) and/or a so called Long Term Evolution (LTE) telecommunication network.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1A:
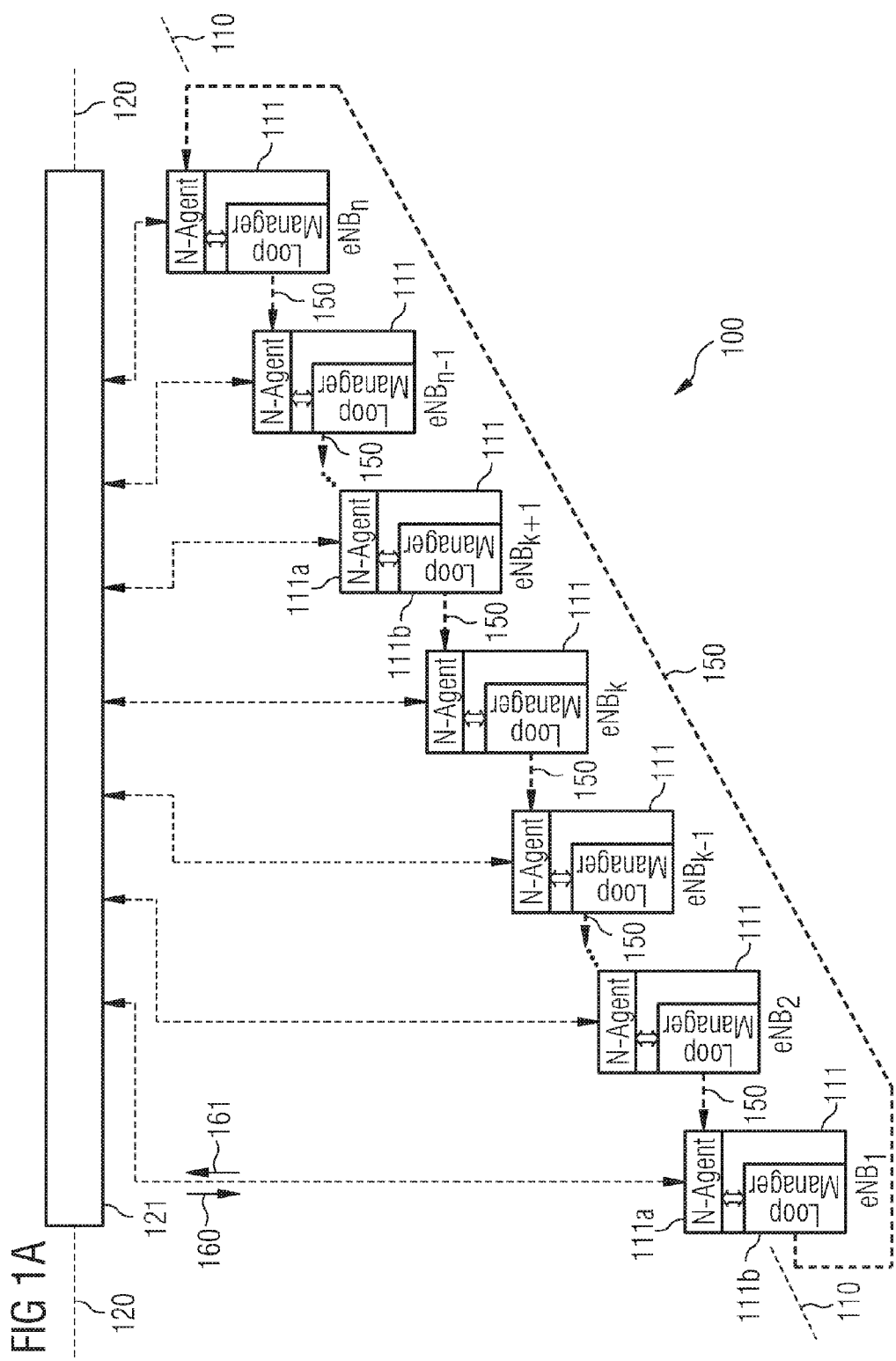
FIGS. 1a and 1b show the architecture of a telecommunication network, which is capable of carrying out a network monitoring method according to a preferred embodiment of the invention.

The illustration in the drawing is schematically. It is noted that in different Figures, similar or identical elements are provided with the same reference signs or with reference signs, which are different from the corresponding reference signs only within the first digit.

Figure 1B:
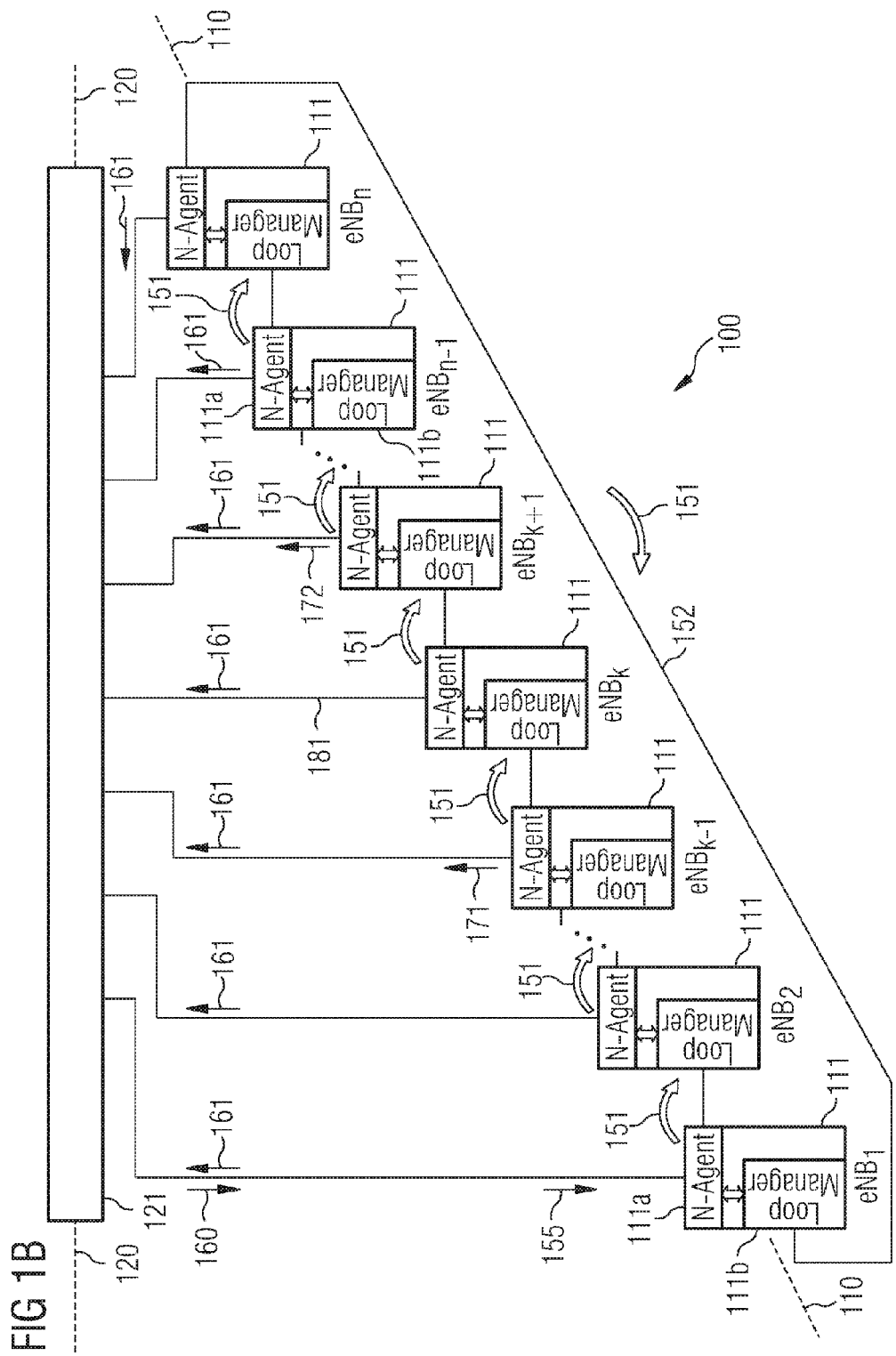
Figure 2:
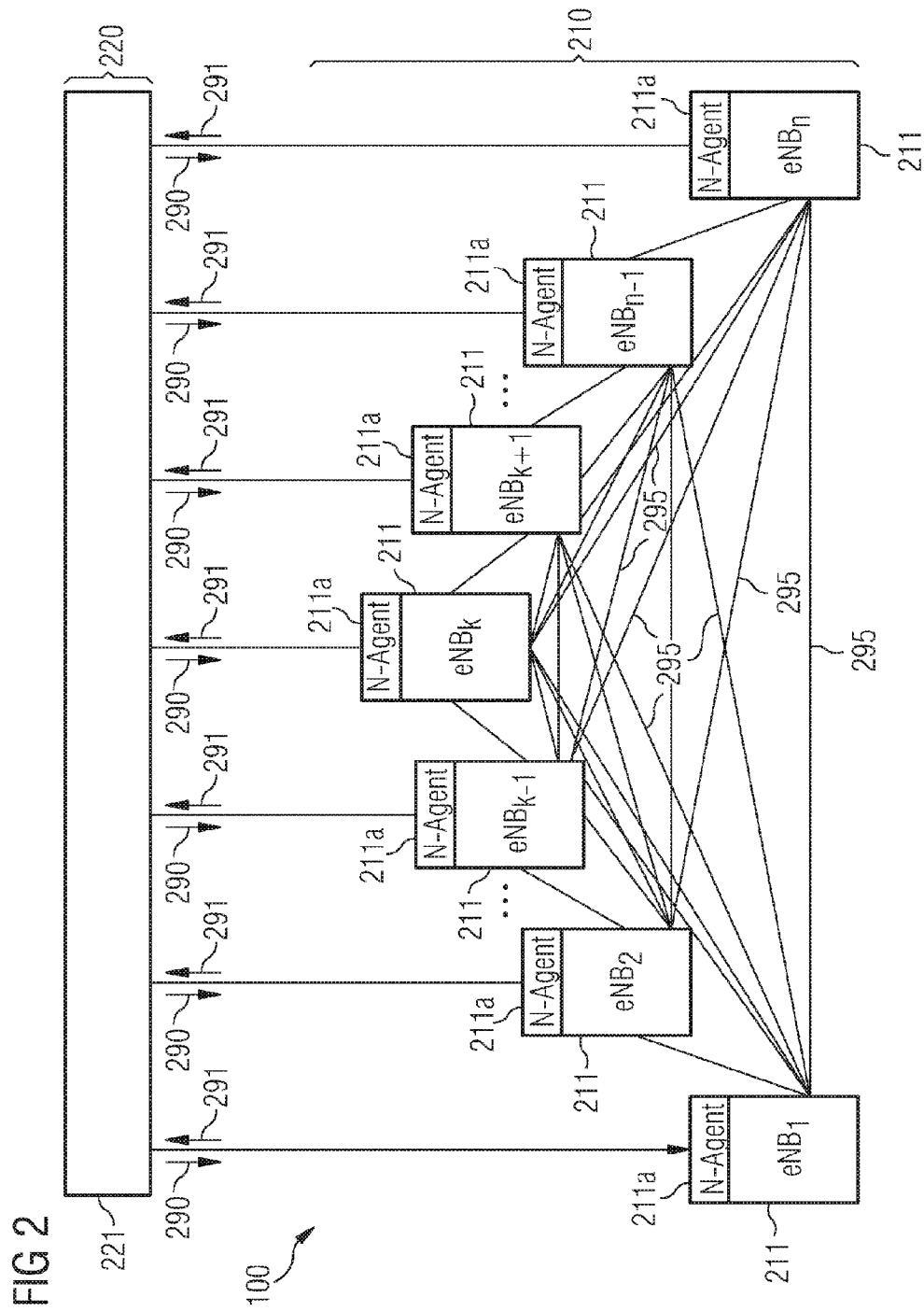
FIG. 2 shows the architecture of a prior art LTE telecommunication network, which for monitoring requires the transmission of a high number of heartbeat notifications transmitted from eNodeBs to a management system.

FIGS. 1a and 1b show the architecture of a telecommunication network 100, which is capable of carrying out a network monitoring method according to a preferred embodiment of the invention. FIG. 1a focuses on the setup of the telecommunication network 100, wherein the logical connection between a plurality of managed entities respectively network elements 111 is established. According to the embodiment described here, network elements 111, which are arranged in a first level 110 of the telecommunication network 100, are eNode Base stations 111 of a Long Term Evolution (LTE) network. In FIGS. 1a and 1b the eNode Base stations 111 are also identified by the abbreviations $eNB_1$, $eNB_2$, ..., $eNB_n$. FIG. 1b focuses on the illustration of a self monitoring of the eNode Base stations 111, which will be described in detail below.

In the following description reference is made both to FIG. 1a and FIG. 1b. The telecommunication network 100 comprises a two level structure, wherein the eNode Base stations 111 are assigned to a first level 110 and a management system 121 is assigned to the second level 120. Each eNode Base station 111 comprises an agent part 111a and a managing part 111b.

Each eNode Base station 111 subscribes a first notification respectively a notify-loopback notification 151 from their neighbouring eNode Base station 111. In FIG. 1a the subscription of notify-loopback notifications 151 is designated with reference numeral 150. Each eNode Base station 111 awaits the receipt of the corresponding notify-loopback notification 151 within a time span defined by a parameter loopback-period. This parameter can be configured in each eNode Base station 111.

The horizontal coupling between the eNode Base stations 111 can be understood in such a manner that the managing part 111b of an eNode Base station 111 acts as a "pseudo manager" for the agent part of the neighbouring eNode Base station 111.

By establishing the described horizontal coupling of all eNode Base stations 111a virtual loop 152 is formed. The notify-loopback notifications 151 will propagate the loop 152 along a clockwise downstream direction from $eNB_1$ to $eNB_2$, from $eNB_2$ to $eNB_2$ and so on. As can be seen from FIG. 1b, the propagation loop 152 is closed by a propagation of the notify-loopback notifications 151 from $eNB_n$ to $eNB_1$. Thereby, each eNode Base station 111 plays the role of (a) an agent for the downstream neighbouring eNode Base station 111 and (b) a manager for the neighbouring eNode Base station 111 being arranged in the opposite upstream direction.

In addition to ordinary event messages such as alarm messages, messages indicating a change in the operational state and/or messages indicating a change of configuration, the management system 121 subscribes second notifications respectively notify-cluster-in-operation notifications 161 from each eNode Base station 111. The subscription of notify-cluster-in-operation notifications 161 is indicated by reference numeral 160. As will be described below in more detail, the management system 121 will receive periodically one notify-cluster-in-operation notification 161 in case all eNode Base stations 111 are in operation.

According to the embodiment described here the management system initiates the self monitoring of the eNode Base stations 111 by means of a trigger loopback command 155, which is transmitted to one of the eNode Base stations 111. The trigger loopback command 155 can comprise a corresponding identification for the selected eNode Base station 111. As can be seen from FIG. 1b, the trigger loopback command 155 is transmitted to the eNode Base station $eNB_1$. The eNode Base station $eNB_1$ generates an original notify-loopback notification 151. The notify-loopback notification 151 comprises a first parameter "notification-type" identifying this notification as a notify-loopback notification and a second parameter "initiator" identifying the eNode Base station 111, which has generated this notify-loopback notification 151. In this case the parameter "initiator" has the value $eNB_1$.

The notify-loopback notification 151 will be received from the downstream neighbouring eNode Base station 111, which has subscribed for the notify-loopback notification 151. At this point it has to be emphasized that the notify-loopback notification 151 is not received from the management system 121. Thereby, the data load of the management system 121 can be reduced significantly.

The propagation of the notify-loopback notification 151 along the loop 152 is executed by applying the following rules:

Rule No. 1:

If the parameter "initiator" is empty, the eNode Base station 111 currently handling the notify-loopback notification 151 inserts its own identification as the parameter "initiator". Thereby, an original notify-loopback notification 151 is generated.

Rule No. 2:

If the parameter "initiator" comprises another eNode Base station identification, the eNode Base station 111 currently handling the notify-loopback notification 151 forwards the notify-loopback notification 151 to the own agent. This agent is the agent part 111a of the downstream neighbouring eNode Base station 111. Thereby, the notify-loopback notification 151 propagates along the loop 152.

Rule No. 3:

If an eNode Base station 111 receives a notify-loopback notification 151, wherein the parameter "initiator" has its own eNode Base station identification, this eNode Base station 111 performs the following two actions:

Action 1: A notify-cluster-in-operation notification 151 is generated, which comprises the own eNode Base station identification. The generated notify-cluster-in-operation notification 151 is transmitted to the management system 121, which has subscribed for the notify-cluster-in-operation notification 151. When receiving a notify-cluster-in-operation notification 151 the management system can conclude that all eNode Base stations 111 are in operation.

Action 2: A new notify-loopback notification 151 is generated, wherein the parameter "initiator" has an empty value. This new notify-loopback notification 151 is transmitted to the next eNode Base station 111. According to Rule No. 1 the next eNode Base station 111 generates a new "original" notify-loopback notification 151, which comprises the identification of the next eNode Base station 111 as the parameter "initiator". This new "original" notify-loopback notification 151 will also propagate along the loop 152 until—after a full loop—it will be received by its own initiator eNode Base station 111.

In the following the network monitoring method will be described in particular with reference to FIG. 1b.

The "original" notify-loopback notification 151, which has been generated by the eNode Base station $eNB_1$, will be received from the eNode Base station $eNB_2$. Following Rule No. 2 this notification 151 will be forwarded to the agent part 111a of the eNode Base station $eNB_2$ and will be subsequently received from the eNode Base station $eNB_3$. The eNode Base station $eNB_3$ again forwards the "original" notify-loopback notification 151. Therefore, this procedure is repeated within the loop until the notification 151 reaches the eNode Base station $eNB_n$.

The eNode Base station $eNB_n$ again forwards the "original" notify-loopback notification 151 to the eNode Base station $eNB_1$. The eNode Base station $eNB_1$ recognizes that the parameter "initiator" comprises its own identification. Now, according to rule No. 3, the eNode Base station $eNB_1$ generates a notify-cluster-in-operation notification 161. When receiving the notify-cluster-in-operation notification 161 the management system 121 will be informed that all eNode Base stations 111 are in operation.

Following rule No. 3, the eNode Base station $eNB_1$ will subsequently generate a notify-loopback notification comprising an empty value as the "initiator" parameter. This notification 151 will be transmitted to eNode Base station $eNB_2$.

Following rule No. 1, the eNode Base station $eNB_2$ will generate a new "original" notify-loopback notification 151 comprising the value "$eNB_2$" as the "initiator" parameter. Again this new "original" notify-loopback notification 151 will propagate along the loop 152. After a full loop the eNode Base station $eNB_2$ will receive this "original" notify-loopback notification 151 and will proceed according to rule No. 3.

This means that each eNode Base station 111 will cyclically adopt (a) the role of the initiator for a notify-loopback notification 151, (b) the role for monitoring all the involved eNode Base stations 111 and (c) the role for reporting to the management system 221. The described monitoring method will continuously proceed according to the above given rules No. 1, No. 2 and No. 3.

It has to be mentioned that after reception of a notify-loopback notification 151 the respectively eNode Base station 111 will reset its own timer. Therefore, the communication network will be able to detect a failure in the propagation of the notify-loopback notification 151.

The above described operation is substantially related to the normal case, wherein all components of the telecommunication network 100 are in operation. In the following it will be demonstrated with reference to FIG. 1b that the described telecommunication network 100 is also able to detect different types of errors and to provide useful information about these errors to the management system 121.

Error No. 1: Failure of an eNode Base Station $eNB_k$

If both the agent part 111a and the managing part 111b of the eNode Base station $eNB_k$ is out of operation, the following situation will occur:

The neighbouring eNode Base station $eNB_{k-1}$ will not receive a get-subscription-status request from eNode Base station $eNB_k$, within a time span defined by a parameter "timeTick", because the manager part 111b of the eNode Base station $eNB_k$ is not operating.

The eNode Base station $eNB_{k-1}$ will generate a first alarm message 171, which will be received from the management system 121. This first alarm message 171 has the meaning "$eNB_{k-1}$: No $eNB_k$ request received".

The other neighbouring eNode Base station $eNB_{k+1}$ will receive no response to the own get-subscription-status request, because the agent part 111a of the eNode Base station $eNB_k$ is not operating.

The eNode Base station $eNB_{k+1}$ will generate a second alarm message 172, which will also be received from the management system 121. This second alarm message 172 has the meaning "$eNB_{k+1}$: No $eNB_k$ response received".

When combining these two alarm messages 171 and 172, the management system 121 can conclude that the whole eNode Base station $eNB_k$ is not in operation.

In order to further allow for a self monitoring of the remaining eNode Base stations 111 the management system triggers the eNode Base station $eNB_{k+1}$ to generate a new "original" notify-loopback notification 151 comprising $eNB_k+_1$ as the "initiator" parameter. This new "original" notify-loopback notification 151 will propagate along the loop 152. In case a further eNode Base station 111 fails, the management system 121 will be informed accordingly based on the procedure described above.

It has to be mentioned that as long as the eNode Base station $eNB_k$ is not operating, the eNode Base station $eNB_{k-1}$ will not receive a get-subscription-status request and the eNode Base station $eNB_{k+1}$ will not receive a get-subscription-status response within the time span defined by the parameter "timeTick". This has the consequence, that the eNode Base station $eNB_{k+1}$ will repeatedly generate a notify-loopback notification 151. However, the eNode Base stations 111 will not permanently repeat their alarm messages 171 and 172 indicating the complete failure of the eNode Base station $eNB_k$. In this respect it has to be mentioned that it is important that at any time only one single notify-loopback notification 151 will propagate within the loop 152. This holds also for the case if more than one eNode Base station 111 has failed. Therefore, an appropriate value for the parameter "timeTick" has to be chosen.

Error No. 2: Failure of the Agent Part 111a of eNode Base Station $eNB_k$

If solely the agent part 111a of eNode Base station $eNB_k$ is out of operation the following situation will occur:

The neighbouring eNode Base station $eNB_{k+1}$ will receive no response to the own get-subscription-status request because the agent part 111a of the eNode Base station $eNB_k$ is not operating.

The eNode Base station $eNB_{k+1}$ will generate the second alarm message 172, which will be received from the management system 121. As has already been mentioned above, this second alarm message 172 has the meaning "$eNB_{k+1}$: No $eNB_k$ response received".

Since the management system 121 receives exclusively the second alarm message 172, it can be concluded that only the agent part of the eNode Base station $eNB_k$ is not working. The managing part of the eNode Base station $eNB_k$ is still in operation.

In order to further allow for a self monitoring of the remaining eNode Base stations 111, the eNode Base station $eNB_{k+1}$ generates a new "original" notify-loopback notification 151 comprising $eNB_{k+1}$ as the "initiator" parameter. This new "original" notify-loopback notification 151 will also propagate along the loop 152. In case a further eNode Base station 111 fails, the management system 121 will be informed accordingly based on the procedure described above.

Error No. 3: Failure of a Communication Channel 181 Between the Management System 121 and the eNode Base Station $eNB_k$ If the communication channel 181 comprises an error, a situation will occur which can be illustrated by the following behaviour:

If all eNode Base stations 111 within the cluster are in operation, the management system 121 will periodically receive a notify-cluster-in-operation notification 161 from various eNode Base stations 111. In particular, the management system 121 will receive a notify-cluster-in-operation notification 161 from the eNode Base station $eNB_{k-1}$ and thereafter from the eNode Base station $eNB_{k+1}$. However, a reception of a notify-cluster-in-operation notification 161 from the eNode Base station $eNB_k$ is not possible, although this notify-cluster-in-operation notification 161 has been transmitted from the eNode Base station $eNB_k$ towards the management system 121.

From the missing notify-cluster-in-operation notification 161 originating from the eNode Base station $eNB_k$ the management system 121 can conclude that the communication channel 181 exhibits a failure and that the eNode Base station $eNB_k$ is working. If the eNode Base station $eNB_k$ would not be in operation, the management system 121 would have received at least the above described second alarm message 172.

It has to be mentioned that it would be advantageous if for instance in case of scheduled repair and/or maintenance work locally at an eNode Base station 111 the management system 121 should be able to temporarily stop the self monitoring of the plurality of eNode Base station 111.

The described network monitoring method provides for the following advantages:

(a) Compared to prior art LTE networks it is no more necessary to load the management system with a plurality of heartbeat notifications each indicating that one single managed entity respectively eNode Base station is in operation. According to the described monitoring method the management system receives only one notify-cluster-in-operation notification per loop period. This only one notify-cluster-in-operation notification informs the management system that all eNode Base stations are in operation. Therefore, the performance of the whole network can be increased and the effort for implementation of the network can be decreased.

(b) In case of a failure the described monitoring method allows for differentiating between various technical reasons for the failures. Therefore, an efficient network management can be achieved, which allows for an increased availability of the network. This increased network availability can be provided because a fast detection of failures and the reasons for the failures can contribute to a high reliability and to a reduction of expenses for the repair of the failures.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

LIST OF REFERENCE SIGNS 100 telecommunication network
110 first level
111 managed entity/network element/eNode Base station
111a agent part
111b managing part
120 second level
121 management system
150 subscribe notify-loopback notification
151 first notification/notify-loopback notification
152 loop
155 trigger loopback command
160 subscribe second notification/subscribe notify-cluster-in-operation notification
161 second notification/notify-cluster-in-operation notification
171 first alarm message
172 second alarm message
181 communication channel
200 telecommunication network
210 first level
211 managed entity/network element/eNode Base station
211a agent part
220 second level
221 management system
290 subscribe heartbeat notifications
291 heartbeat notifications
295 peer to peer connections

The invention claimed is:

1. A method for monitoring an operational state of a telecommunication network having a first level comprising a plurality of managed entities and a second level comprising a management system for managing the managed entities of the first level, the method comprising:
propagating a first notification of a first type within the first level from a first managed entity to a second managed entity via successive other managed entities back from the second managed entity towards the first managed entity;
transmitting a notification of a second type from one of the plurality of managed entities to the management system, the notification of a second type indicating that the first notification of a first type has propagated from the first managed entity to the second managed entity via successive other managed entities back to the first managed entity; and
once the first notification of the first type has been received by the first managed entity, propagating a second notification of the first type within the first level from a managed entity other than the first managed entity via successive other managed entities back towards the managed entity from which the second notification of the first type was propagated.

2. The method according to claim 1, wherein, if all managed entities are in operation, the first notification of the first type is a notify-loopback notification, which is sequentially propagating from one managed entity to another managed entity in such a manner that a virtual loop is formed, wherein the virtual loop comprises each of the plurality of managed entities, and
the notification of the second type is a notify-cluster-in-operation notification reporting to the management system that all managed entities of the virtual loop are in operation.

3. The method according to claim 2, wherein each of the plurality of managed entities subscribes for a notify-loopback notification from a respectively neighboring managed entity, and awaits a reception of the notify-loopback notification from the respectively neighboring managed entity within a loopback-period time span.

4. The method according to claim 2, wherein an originator entity of the plurality of managed entities initiates the propagation of the notify-loopback notification.

5. The method according to claim 4, wherein the originator entity generates the notify-loopback notification, the notify-loopback notification comprising:
a notification type parameter identifying the notify-loopback notification as to represent a notify-loopback notification; and
an initiator parameter identifying the originator entity as the managed entity which has generated the notify-loopback notification.

6. The method according to claim 5, wherein, when the originator entity has received the notify-loopback notification identifying the originator entity as the managed entity which has generated the notify-loopback notification, the originator entity transmits a notify-cluster-in-operation notification to the management system.

7. The method according to claim 6, wherein, when the originator entity has transmitted a notify-cluster-in-operation notification to the management system, a further originator entity initiates the propagation of a further notify-loopback notification, whereby
within the virtual loop, the further originator entity is a neighbouring neighboring entity of the originator entity, and
the further notify-loopback notification comprises a further initiator parameter identifying the further originator entity as the managed entity which has generated the further notify-loopback notification.

8. The method according to claim 7, wherein, when the originator entity has transmitted a notify-cluster-in-operation notification to the management system, the originator entity triggers the further originator entity in order to initiate the propagation of the further notify-loopback notification.

9. The method according to claim 1, wherein each managed entity comprises a managing part and an agent part, whereby
the managing part is coupled to an agent part of another managed entity, which is located upstream with respect to the propagation direction of the first notification, and
the agent part is coupled to a managing part of a further another managed entity, which is located downstream with respect to the propagation direction of the first notification.

10. The method according to claim 9, wherein, if one of the managed entities exhibits a failure,
the corresponding upstream neighboring managed entity transmits a first alarm message to the management system, the first alarm message indicating that the managing part of the one of the managed entities exhibits a failure, and
the corresponding downstream neighboring managed entity transmits a second alarm message to the management system, the second alarm message indicating that the agent part of the one of the managed entities exhibits a failure.

11. The method according to claim 10, wherein the downstream neighboring managed entity
generates a notify-loopback notification identifying the downstream neighboring managed entity as the managed entity which has generated this notify-loopback notification, and
transmits this notify-loopback notification to further managed entities being arranged further downstream with respect to the upstream neighboring managed entity.

12. The method according to claim 9, wherein, if the agent part of one of the managed entities exhibits a failure, the corresponding downstream neighboring managed entity transmits a second alarm message to the management system.

13. The method according to claim 9, wherein, if a transmission channel between the management system and one of the managed entities exhibits a failure, the management system records an absence of the notification of the second type from the one of the managed entities.

14. A managed entity for a telecommunication network, the managed entity being in connection with a management system and at least one further managed entity, each managed entity comprising at least a processor and a memory, and being configured to carry out the method as set forth in claim 1.

15. A telecommunication network for mobile terminal devices, comprising:
a management system; and
at least two managed entities as set forth in claim 14.

* * * * *